April 15, 1958  J. H. KIRBY II  2,830,664
PERMANENT MAGNET FISHING TOOL
Original Filed Aug. 2, 1951  2 Sheets-Sheet 1
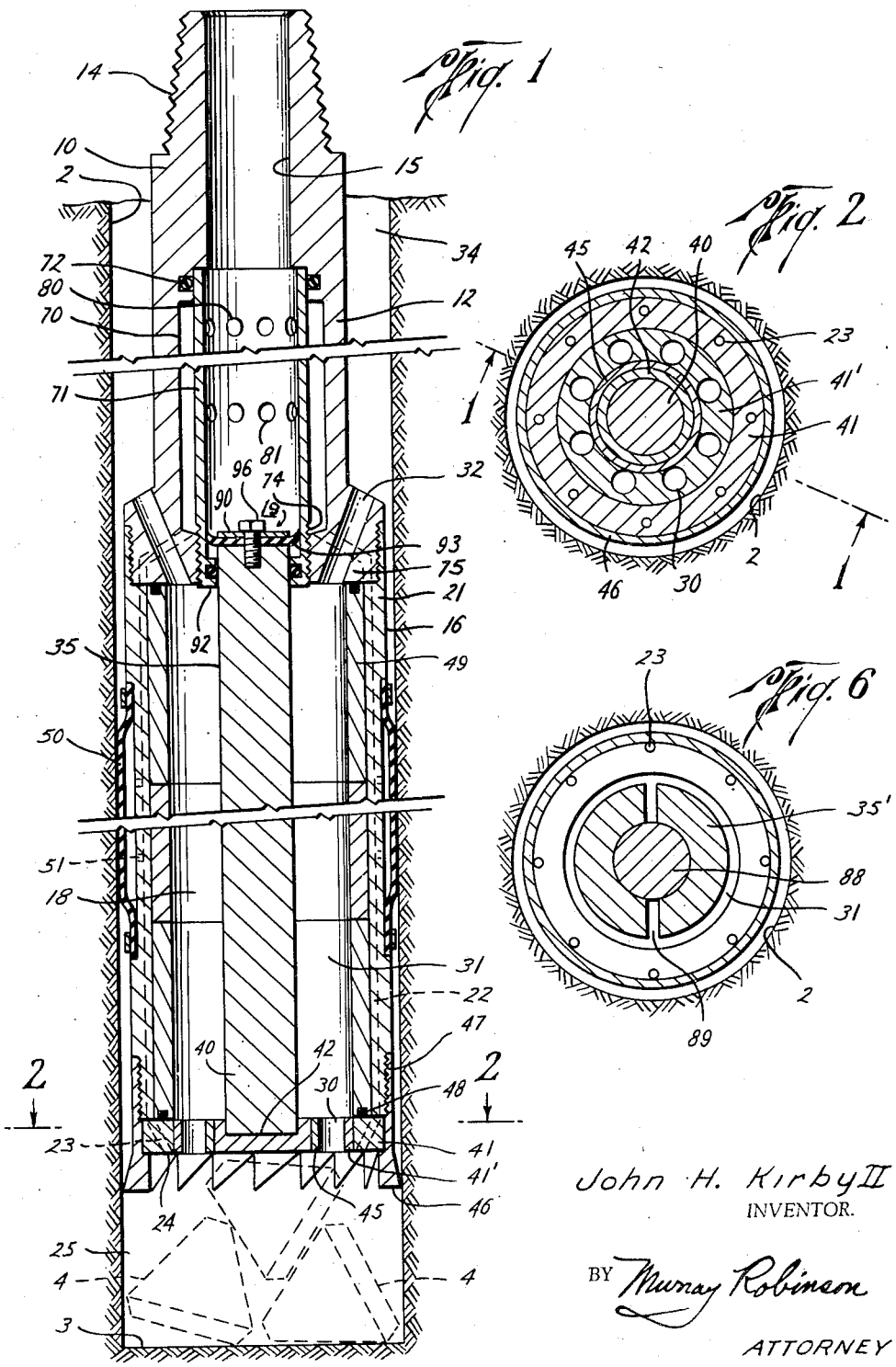
John H. Kirby II
INVENTOR.
BY Murray Robinson
ATTORNEY April 15, 1958 J. H. KIRBY II 2,830,664
PERMANENT MAGNET FISHING TOOL
Original Filed Aug. 2, 1951 2 Sheets-Sheet 2
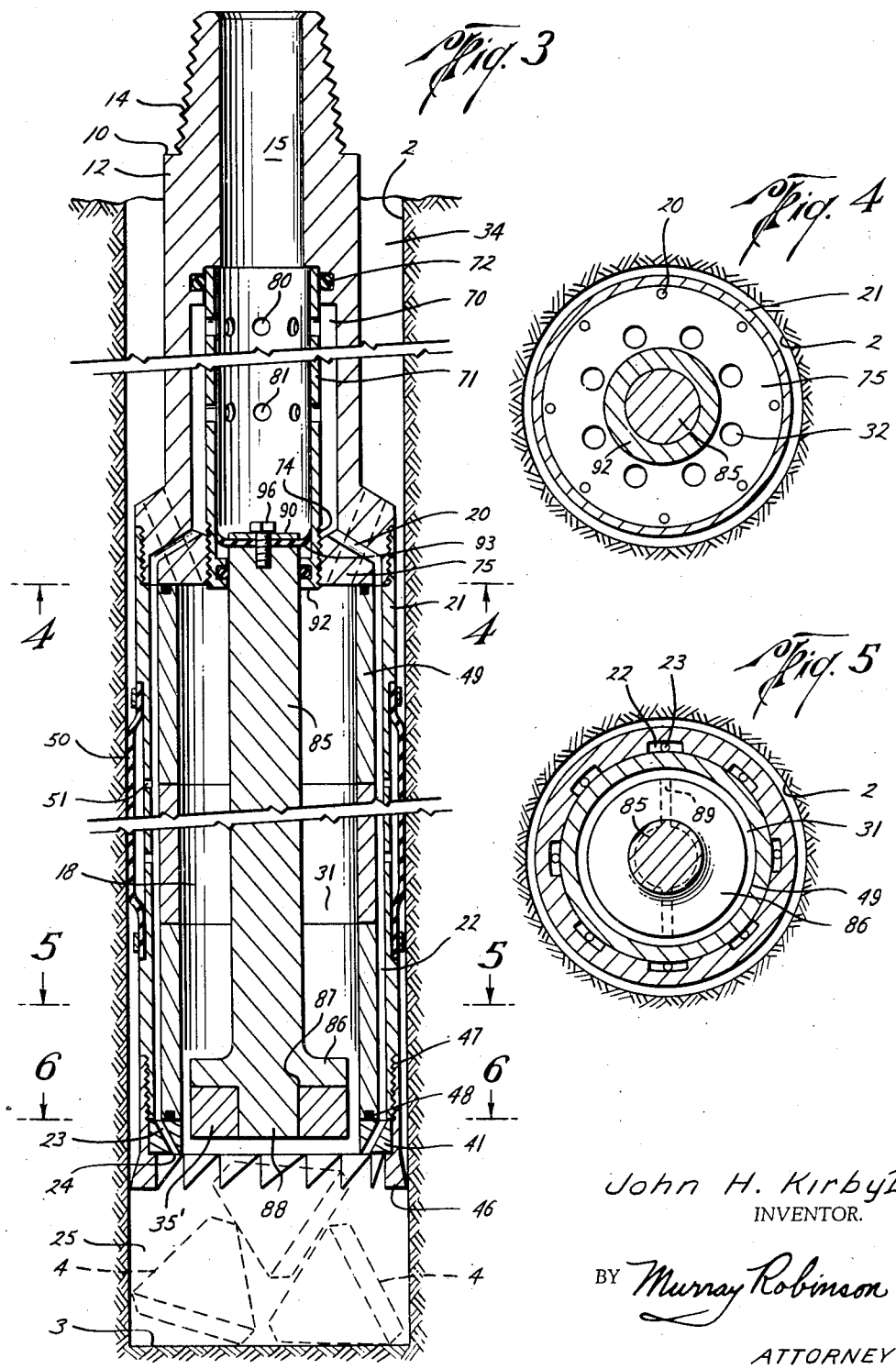
John H. Kirby II
INVENTOR.
BY Murray Robinson
ATTORNEY

United States Patent Office 2,830,664
Patented Apr. 15, 1958

2,830,664

PERMANENT MAGNET FISHING TOOL

John H. Kirby II, Houston, Tex.

Continuation of application Serial No. 239,901, August 2, 1951. This application February 25, 1957, Serial No. 641,949

The portion of the term of the patent subsequent to February 2, 1971, has been disclaimed 6 Claims. (Cl. 166—65)

The invention relates to a well tool which is particularly adapted for the recovery of junk from a well bore, generally known as a fishing tool.

This application is a continuation of my prior application Serial Number 239,901, filed August 2, 1951, now abandoned.

In the drilling of wells by the rotary method a drill bit is rotated and lowered into the well bore by means of a string of drill pipe, and such wells are sometimes drilled to a depth of ten or fifteen thousand feet, and only recently a well has gone to twenty thousand feet.

It is only natural that a drill bit or other tools in such a well bore are subjected to a great deal of vibration and agitation, and the various parts or elements thereof become loosened and drop, or are left in the well bore in such a manner as to interfere with the further drilling of the bore.

In connection with the present application, the invention will be described for the purpose of the recovery of such junk or fish from the well bore, and the present drawings illustrate three of the cones which have come loose from a standard type of rotary rock drilling bit where the cones are mounted on short stub shafts and caused to cut the bottom of the well bore.

It is important that such cones be recovered from the well bore before the drilling may be resumed.

It is one of the objects of the present invention to provide a fishing tool with a permanent magnet of a particular type whereby the magnetic field of such magnet is moved into a position such as will attract the fish with the resultant recovery of the fish from the well bore.

Another object of the invention is to provide a fishing tool hollow body, in which the permanent magnet is mounted with an annular space therearound so that it may be possible to set up a reverse flow of liquid upwardly through the tool.

Another object of the invention is to provide a permanent magnet fishing tool wherein a reverse flow of liquid and the magnetic attraction of the fish tend to cooperate together to accomplish much lifting action.

Another object of the invention is to provide a permanent magnet fishing tool in which a stream of liquid may be discharged downwardly through the tool and the direction of such flow reversed, so that there will be a tendency to lift the fish or junk and raise it for attraction by such magnet.

It is also an object of the invention to provide a reverse circulation for well liquid past a magnet in the tool, tending to lift the junk into the magnetic field.

A still further object of the invention is to provide a fishing tool with a permanent magnet which is slidably arranged in the tool so as to attract a fish or piece of junk over which a tool may be lowered to cause a relative movement between the tool and the magnet, which will in turn affect the volume of flow of liquid through the tool as an indication to the operator that a piece of junk has been recovered by the tool.

A still further object of the invention is to provide a permanent magnet fishing tool with an expansible packing which will tend to create a seal between the periphery of the tool and the well bore, so as to cause the circulation of liquid to return upwardly through the tool so as to facilitate the junk's recovery by the combination of the flow of liquid and the attraction of the magnet.

Still another object of the invention is to provide a permanent magnet fishing tool wherein the magnet is caused to slide in the tool by engagement with the fish and wherein further such sliding action affects the volume of flow of the circulating liquid so as to indicate to the operator by such change in volume of flow that the fish has been recovered.

A still further object of the invention is to vary the flow of liquid through a permanent magnet fishing tool as a function of the size, amount, or number of pieces of junk which have been recovered.

Other and further objects of the invention will be readily apparent when the following description is considered in connection with the accompanying drawings, wherein:

Fig. 1 is a vertical sectional view taken on line 1—1 of Figure 2 showing a permanent magnet fishing tool wherein the circulation of the liquid acts in combination with the magnetic attraction to recover the junk in the tool and wherein further there will be a movement of the magnet as a function of the junk recovered.

Fig. 2 is a sectional view taken transverse of the tool of Fig. 1 upon the line 2—2 and looking in the direction of the arrows of Fig. 1.

Fig. 3 is a vertical sectional view of a slightly modified form of the permanent magnet fishing tool; and Figs. 4, 5, and 6 are horizontal sections taken on lines 4—4, 5—5, and 6—6, respectively, of Figure 3.

The most simple form of the invention is seen in Fig. 1 wherein is illustrated well bore 2 drilled by the rotation of a bit by the rotary method of drilling wells.

Such drill bits have movable elements thereon such as the cones which are mounted to engage the base 3 of such well bore 2 and to cut the bore.

It will be understood that an abrasive drilling mud or liquid is pumped down through the drill pipe and is discharged at the bottom of the bore to cool the bit and carry away the cuttings. This abrasive material in combination with the rotation and the pressures applied often result in the loss of the cones 4 from the drill bit. If such a cone, known as a piece of junk, remains in the bottom of the well bore it, of course, interferes with the future drilling operations, and it is desirable to recover such a cone or piece of junk with as little delay and cost as possible. In the drawing in Fig. 1 three such cones 4 have been illustrated as having been lost in the well bore.

The present tool comprises a body designated generally at 10 and including a neck 12 which is hollow in form and of a size to be lowered into the well bore by being threaded at 14 to a string of pipe. The passage 15 extending into the neck 12 accommodates a flow of drilling liquid as is well known in the art.

The body 10 is enlarged at 16 so that it closely approaches the size of the well bore 2. The lower end of such body is also hollow at 18 as will be described.

A partition means 19 to be described in more detail hereinafter extends across the passage 15 so as to cause the flow of drilling liquid to move laterally through the openings 20, a number of which have been provided. In this manner the cross-sectional area of the passage 15 is approximated by the cross sectional area of the plurality of passages 20.

The wall 21 of the side of such body is provided with the vertical passages 22 communicating with passages 20 to accommodate the discharge of the flushing liquid downwardly through the fishing tool. The passages 22 are formed by vertical grooves in the inner face of wall 21 (see Figure 5 for the same construction in the other form of the invention), the grooves being covered by an inner sleeve which may be made of a plurality of rings 49 resting on base ring 41. The flushing liquid will pass through the passages 22 and the inwardly directed passages 23 in base ring 41 so as to discharge at 24 below the tool in an inward direction. Inasmuch as the space 25, constituting the lower end of the well bore below the tool, is a substantially closed area, the discharge of this liquid at 24 reverses its direction and moves upwardly through the openings 30 in pole plate 41' into the space 31 which is an annular space inside of the wall 21 of the body of low carbon steel.

The upflow of liquid may discharge from the space 31 through outlets 32 in body 10 into the annular space 34 in the well bore around the body 10.

From the foregoing it will be apparent that there will be a tendency of the flow of liquid discharging at 24 to lift the cones or junk 4 to a substantial extent because of its reversal of direction.

This flow of liquid is one source of power for setting the tool on the junk 4.

The present tool body 10 carries therein a permanent magnet 35 which is of an elongated construction, with the upper end of such magnet 35 disposed in neck 12. With a magnet so positioned, and the north pole at the upper end, the south pole 40 will, of course, be at the lower or opposite end of the magnet from the north pole.

The base ring 41 cooperates with pole plate 41' at the bottom of the magnet 35 to support the south pole 40 of the magnet laterally and retain it in centralized position relative to wall 21. It will be appreciated that, as pointed out in more detail hereinafter, the magnet 35 is movably disposed within body 10 with plate 41' being slidable relative to base ring 41 as a support for the south pole 40 of the magnet. This plate 41' may be recessed at 42 to receive the end 40 of the magnet to which it is suitably secured and there may be the openings 30 through the outer part of the plate which is insulated from the balance of the plate by the non-magnetic circular ring 45. In this manner there will be no grounding or shorting of the magnet across the plate 41'.

In normal operation with a magnet thus disposed the lines of flux will extend between the north pole 37 and the south pole 40 along the walls 21.

Because of the non-magnetic portion of the plate 41' there will therefore be set up an external magnetic field across the bottom of the tool where the lines of flux pass into the south pole 40 radially through the base ring 41 from the walls 21. In this manner the upper cone or piece of junk 4 will be present in the magnetic field of the magnet when the tool is lowered to the position shown in Figure 1. Such a piece of junk 4 will be attracted in this manner so that it may be lifted and removed from the well bore. The base ring 41 around plate 41' will be held in position by the rotary shoe 46 which is threaded at 47 onto the lower end of the wall 21 of the tool. A seal ring 48 may be provided if desired.

The magnet 35 is of a construction which is now marketed under the trade name "Alnico V." Such magnets may consist of the combination of cobalt, aluminum, nickel, and iron. Such a magnet may have a capacity of picking up 500, 1,000, or even 2,000 pounds, which considered ounce for ounce with previous magnets may approximate 24 times prior known magnets. Such magnets also are known to have a resistance to demagnetization which is 8 times the resistance of other previous known magnets. A reference to a magnet made of a platinum alloy which is also suitable for use in the present tool may be found in Quick Magazine of May 28, 1951, at page 47, where it is indicated that such a magnet is manufactured by General Electric Company.

Improvements in such magnets have also been made where the magnet includes platinum and cobalt.

In actual operation the tool may be connected to a pipe at 14 and lowered into the well bore with a view of moving the magnetic field at the lower end of the tool closely adjacent the south pole of the magnet into a position in which to attract the fish or junk.

In order to encourage the circulation of liquid down through the pipe and inwardly through the tool to assist in recovering the junk a packer member 50 is shown as having been arranged circumferentially about the tool so that the packing element extends radially sufficient to contact the wall of the well bore. Such a packer would normally tend to expand and prevent a return flow of liquid upwardly around the drill bit, but such prevention is enhanced by the arrangement of the small openings 51 through the wall 21 from the passages 22 so that there will be a liquid pressure applied inside of the packing element to assist in effecting a seal around the outside of the tool.

Under such circumstances there will be a complete reversal of circulation at the bottom of the tool so as to assist in lifting the junk.

It is desirable to be able to tell when the tool has engaged a piece of junk. To this end the passage 15 has been enlarged at 70 and has been fitted with a hollow sleeve 71. A seal is formed about this sleeve at 72 by an O-ring.

This sleeve is threaded at 74 into the base 75 of the upper end of the tool, and such sleeve will be positioned in leak-proof condition by the assembly of the parts.

There are a plurality of ports annularly disposed in sleeve 71 at a plurality of vertically spaced levels, such as ports 80 forming an upper ring of ports and ports 81 forming a lower ring. When there is a flow of liquid down through the passage 15 this flow of fluid may move out through the ports 80, 81 in the sleeve 71 and discharge into the enlarged area 70 and thence through the passages 22 down through the sidewall 21 of the enlarged portion of the tool.

Before completing the description of the means for indicating at the surface when a piece of junk has been engaged, the Figure 3 embodiment of the invention will be described. The embodiment of the tool shown in Figures 3–6 is largely the same as that shown in Figures 1 and 2 except for the magnets. The annular space 31 is the same in Figure 3 as Figure 1 except that there has been provided a non-magnetic spindle 85 which is slidably arranged in such annular space rather than having a bar magnet so positioned as in the construction of Figure 1.

This non-magnetic spindle 85 is arranged with a head 86 and a lateral cutaway 87 on which is disposed a magnet 35' in the shape of a ring having a slot 89 thereacross. The position of the magnet 35' depends upon the sliding of the non-magnetic spindle. The magnet is thus suspended in the lower portion of the tool recess closely adjacent the lower end thereof.

Generally, this construction is similar to that of Figure 1 except that the magnet 35' is mounted on the mandrel 85 which is movable vertically of the tool.

The upper end of the spindle 85 is disposed above the stop ring 92 and may have the sealing cup 93 held thereon by cap 90 and screw 96 so as to insure a seal between the spindle and sleeve 71. A seal may also be provided between base 75 and the upper end of annular magnets 49. The same construction is used in the embodiment of Figures 1 and 2 to seal the upper end of magnet 35. This is the partition means 19 previously referred to.

It seems obvious, therefore, that in both embodiments of the invention when the tool is lowered into the operating position that the magnet will be in the lowermost position shown and will exert a magnetic force upon the junk or cones 4, tending to lift them into the tool.

In event, however, that the tool is lowered over a piece of junk such as the cone 4 the magnet will engage the cone or fish and the continued lowering action of the tool will cause the cone to stop the downward movement of the magnet 35 or 35' whereas the tool continues downwardly. In this manner the sleeve 71 will be telescoped over the upper end of the magnet or spindle to such an extent that it will cover the ports 81 and choke off at least a part of the discharge of liquid. This choking off will be an indication to the driller that there has been a restriction of circulating liquid and an indication that a piece of junk has been encountered and picked up. In some instances continued lowering action may raise the packing 93 above both rows of openings or ports to such an extent that there may be a complete shut off of the circulating liquid.

Such a shut off will be readily apparent to the driller and an indication to him that he has recovered one or more pieces of junk and that he should withdraw the tool to the surface to recover the junk.

It seems obvious that both embodiments of this tool are very similar, that the magnet is applied in an efficient manner and that the invention broadly contemplates the combination of a permanent magnet and the circulation of liquid in the well to exert a combined lift on the junk or fish.

I claim:

1. A permanent magnet fishing tool comprising a pair of coaxially disposed members providing inner and outer radially spaced portions, the outer portion being of tubular form with at least a part thereof being magnetic material, the inner portion being of elongated form with at least a part thereof being magnetic material, said inner portion including a permanent magnet, said outer portion providing an annular magnetic pole at the lower end of said outer portion surrounding said inner portion, and a body connecting said inner and outer portions together, said body having means thereon for connecting the tool to conduit means for raising and lowering the tool in a well and thereby to a source of fluid under pressure to conduct fluid through the annular space between said inner and outer portions, means slidably mounting said inner portion relative to said outer portion whereby the lower end of said inner portion is moved up above the lower end of and inside said outer portion on application of force to the lower end of said inner portion, and a rotary shoe removably secured to the lower end of said outer portion.

2. A well tool for the recovery of junk in a well bore drilled by the rotary method comprising a hollow body, a hollow neck on the upper portion of said body having a connection thereon for a pipe, a permanent magnet disposed in said body with its north pole upper end in the hollow portion of said neck, said body including inner and outer walls, said inner wall defining the outside of a fluid flow space from the lower part of and out through said body around said magnet, for the up flow of liquid to assist in the recovery of junk, said body having passage means extending from said fluid flow space to the outside of said body, a base for said body including a support for the south pole of said magnet, a non-magnetic member about such south pole, and down flow passages from the upper end of said body between the walls of said body and communicating with said hollow neck to discharge liquid outwardly from said tool to flow around the junk in the well to wash the junk upwardly toward and to be attracted by said magnet, said magnet being movably disposed in said hollow body.

3. A well tool for the recovery of junk in a well bore drilled by the rotary method comprising, a hollow body, a hollow neck on the upper portion of said body having a connection thereon for a pipe, a permanent magnet disposed in said body with its north pole upper end in the hollow portion of said neck, said body including inner and outer walls, said inner wall defining the outside of a fluid flow space from the lower part of and out through said body around said magnet, for the up flow of liquid to assist in the recovery of junk, said body having passage means extending from said fluid flow space to the outside of said body, a base for said body including a support for the south pole of said magnet, a non-magnetic member about such south pole, and down flow passages from the upper end of said body through the wall of said body and communicating with said hollow neck to discharge liquid outwardly from said tool to flow around the junk in the well to wash the junk upwardly toward and to be attracted by said magnet, said magnet being movably disposed in said hollow body, and a portion on said magnet in said neck to reduce the inlet of liquid from the upper end of the tool as an indication that junk has been recovered.

4. A well tool for the recovery of junk in a well bore drilled by the rotary method comprising, a hollow body, a connection at the upper end thereof for a pipe, inlet means placing said connection in communication with the interior of said hollow body at the upper end thereof, a non-magnetic spindle having at its lower end a permanent magnet disposed in said body and with its upper end in the hollow portion of said body, a fluid flow space extending from the lower part of said body around said magnet up around said spindle and out through said body for the up flow of liquid to assist in the recovery of junk, a base for said body around the outside of said magnet, and down flow passages from the upper end of said body through the wall of said body to discharge liquid to flow around the junk in the well to wash the junk upwardly toward and to be attracted by said magnet, said magnet carrying spindle being movably mounted in said hollow body for axial movement upwardly in the same direction as the fluid flow past the magnet.

5. A well tool for the recovery of junk in a well bore drilled by the rotary method comprising, a hollow body, a connection at the upper end thereof for a pipe, inlet means placing said connection in communication with the interior of said hollow body at the upper end thereof, a non-magnetic spindle having at its lower end a permanent magnet disposed in said body and with its upper end in the hollow portion of said body, a fluid flow space extending from the lower part of said body around said magnet up around said spindle and out through said body for the up flow of liquid to assist in the recovery of junk, a base for said body around the outside of said magnet, and down flow passages from the upper end of said body through the wall of said body to discharge liquid to flow around the junk in the well to wash the junk upwardly toward and to be attracted by said magnet, said magnet carrying spindle being movably mounted in said hollow body, and a means on said magnet carrying spindle at the upper end of the spindle cooperating with means in said inlet means to form a valve actuated in the closing direction by upward movement of said spindle to reduce the inlet of liquid from the upper end of the tool as an indication that junk has been recovered.

6. A permanent magnet fishing tool comprising a pair of coaxially disposed members providing inner and outer radially separated portions, the outer portion being of tubular form with at least a part thereof being magnetic material, the inner portion being of elongated form with at least a part thereof being magnetic material, said inner portion including a permanent magnet, said outer portion providing an annular magnetic pole at the lower end of said outer portion surrounding said inner portion; a body including an upper hollow portion having means on its upper end for connecting the tool to conduit means for raising and lowering the tool and thereby to a source of fluid under pressure, and a lower hollow portion having means at its lower end projecting inwardly to form a support and downwardly to provide teeth; said lower hollow portion surrounding said outer portion, the upper end of said lower hollow portion being connected to the lower end of said upper hollow portion, said outer portion being held against axial movement only between said support at its lower end and the lower end of said upper hollow portion, and fluid passage means between said outer portion and said lower hollow portion communicating at the upper end thereof with the interior of said upper hollow portion and at its lower end with the bottom exterior of the tool.

References Cited in the file of this patent

UNITED STATES PATENTS

| | | |
|---|---|---|
| 2,431,361 | Athy | Nov. 25, 1947 |
| 2,493,992 | Murphy et al. | Jan. 10, 1950 |
| 2,522,294 | Noble | Sept. 12, 1950 |
| 2,556,849 | Nolley et al. | June 12, 1951 |
| 2,582,602 | Paysinger | Jan. 15, 1952 |
| 2,613,980 | Hawkins | Oct. 14, 1952 |
| 2,696,260 | Fast | Dec. 7, 1954 |